United States Patent [19]
Sasaki et al.

[11] Patent Number: 5,211,082
[45] Date of Patent: May 18, 1993

[54] CONTROL APPARATUS FOR AUTOMATIC TRANSMISSION

[75] Inventors: Kazuo Sasaki; Takuji Fujiwara; Tatsutoshi Mizobe, all of Hiroshima, Japan

[73] Assignee: Mazda Motor Corporation, Hiroshima, Japan

[21] Appl. No.: 810,154

[22] Filed: Dec. 19, 1991

[30] Foreign Application Priority Data

Dec. 27, 1990 [JP] Japan .................................. 2-407838

[51] Int. Cl.$^5$ .............................................. F16H 61/12
[52] U.S. Cl. ........................................ 74/878; 475/119; 475/122
[58] Field of Search ............. 74/878, 336 R; 475/118, 475/119, 121, 122

[56] References Cited

U.S. PATENT DOCUMENTS

| | | | |
|---|---|---|---|
| 4,246,990 | 1/1981 | Strantz | 475/119 X |
| 4,488,457 | 12/1984 | Nishimura et al. | 74/878 X |
| 4,984,486 | 1/1991 | Takada et al. | 74/878 X |
| 4,987,798 | 1/1991 | Fuhahashi et al. | 74/878 X |
| 5,005,445 | 4/1991 | Gierer | 74/878 |

FOREIGN PATENT DOCUMENTS

| | | | |
|---|---|---|---|
| 3931136 | 3/1990 | Fed. Rep. of Germany | 74/878 |
| 2-80859 | 3/1990 | Japan | 74/878 |
| 2-89865 | 3/1990 | Japan | 74/878 |

Primary Examiner—Rodney H. Bonck
Assistant Examiner—Ryan W. Massey
Attorney, Agent, or Firm—Keck, Mahin & Cate

[57] ABSTRACT

A control apparatus for an automatic transmission has a control unit which, when a selector lever is shifted from a forward drive gear range to a reverse gear range when the vehicle speed is not lower than a first predetermined speed, prevents the gear stage from being changed to that corresponding to the reverse gear range until the vehicle speed has fallen to a speed not greater than a second predetermined speed lower than the first predetermined speed. The control unit allows the gear stage to be changed to that corresponding to the reverse gear range if the selector lever is shifted to the reverse gear range when the vehicle speed is lower than the first predetermined speed. This control apparatus, therefore, ensures that the gear stage can be changed to that corresponding to the reverse gear range only when the driver intentionally shifts the selector lever from one of the forward drive gear ranges to the reverse gear range.

4 Claims, 7 Drawing Sheets

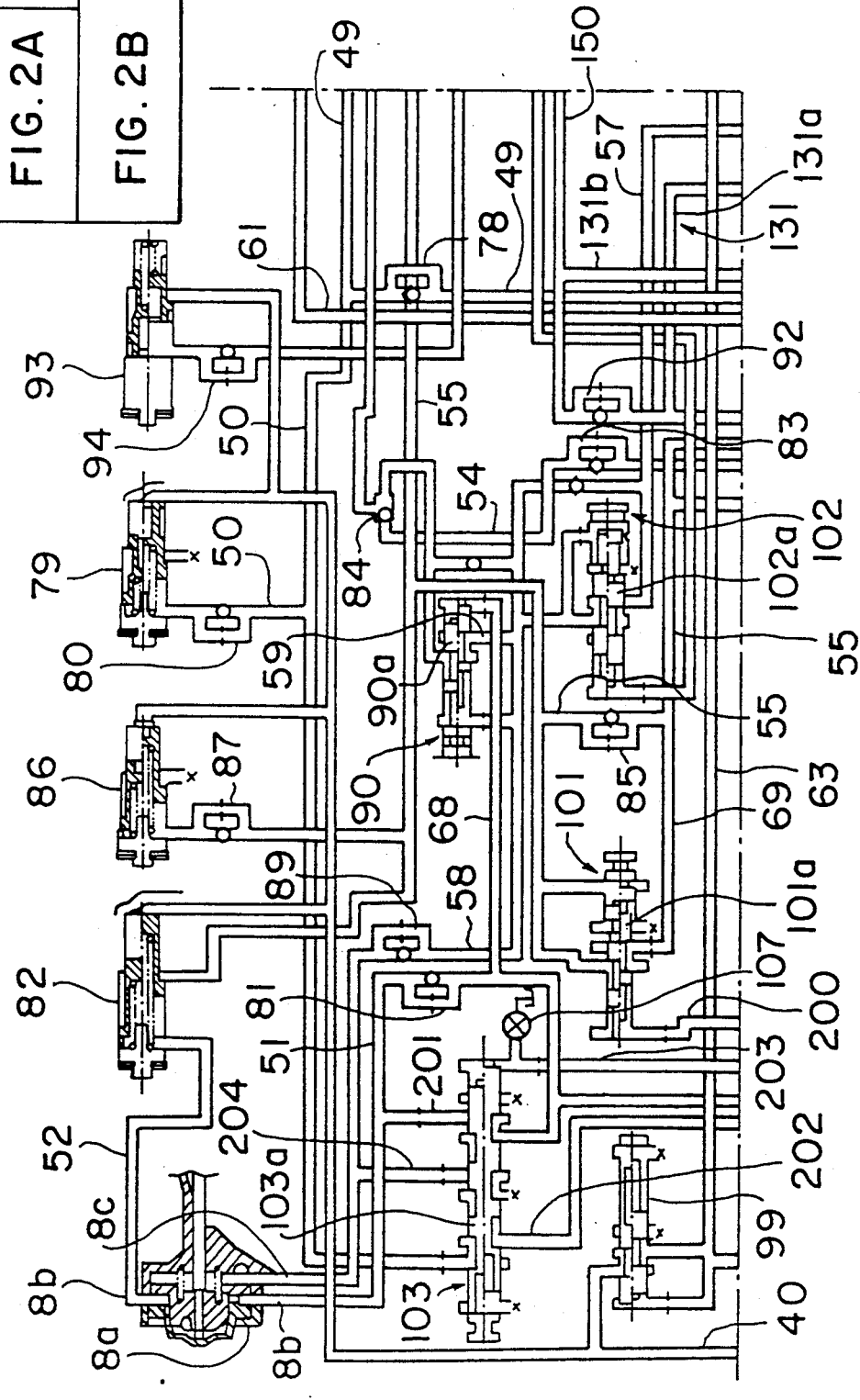

CONTROL APPARATUS FOR AUTOMATIC TRANSMISSION

BACKGROUND OF THE INVENTION

The present invention relates to a control apparatus for an automatic transmission and, in particular, to a control apparatus for an automatic transmission which can allow the gear stage to be changed to that corresponding to the reverse gear range only when the driver intentionally shifts the selector lever from one of the forward drive gear ranges to the reverse gear range, thereby changing the gear stage to that corresponding to the reverse gear range in the manner intended by the driver.

DESCRIPTION OF PRIOR ART

In automatic transmissions, when the selector lever is shifted from one of the forward drive gear ranges to the reverse gear range, no problem arises if the shifting is effected in accordance with the driver's intention. However, when the selector lever is erroneously shifted, i.e., when the driver is not aware of the fact that the gear stage has been changed, a problem of drivability arises if the vehicle speed is high.

Japanese Patent Application Disclosure No. Sho 63-13949 proposes a control apparatus for an automatic transmission for solving the above-mentioned problem by controlling the automatic transmission so as to prevent the gear stage from being changed from a gear stage corresponding to one of the forward drive gear ranges to that corresponding to the reverse gear range if the vehicle is moving forward at a speed higher than a critical predetermined speed, even if a selector lever is shifted by a driver from one of the forward drive gear ranges to the reverse gear range.

However, when the gear stage is prevented from being changed from the gear stage corresponding to one of the forward drive gear ranges to that corresponding to the reverse gear range when the vehicle is moving forward at a speed higher than the critical predetermined speed, if the critical speed for preventing the gear stage from being changed to the gear stage corresponding to the reverse gear range is set low, it becomes difficult to operate the vehicle in accordance with driver's intention when it is necessary to frequently drive the vehicle forward and rearward for parking the vehicle in a garage or for other such purposes. On the other hand, if the critical speed is set high, a problem of drivability arises when the selector lever is erroneously shifted.

SUMMARY OF THE INVENTION

It is, therefore, an object of the present invention to provide a control apparatus for an automatic transmission which controls the automatic transmission so as to prevent the gear stage from being changed from a gear stage, corresponding to one of the forward drive gear ranges, to that corresponding to the reverse gear range, even when the selector lever is shifted from one of the forward drive gear ranges to the reverse gear range, if the vehicle is moving forward at a speed not lower than a predetermined speed. The control apparatus allows the gear stage to be changed to that corresponding to the reverse gear range only when the driver intentionally shifts the selector lever from one of the forward drive gear range to the reverse gear range, thereby changing the gear stage to that corresponding to the reverse gear range in the manner intended by the driver.

The above and other objects of the present invention can be accomplished by a control apparatus for an automatic transmission comprising control means which, when a selector lever is shifted from one of the forward drive gear ranges to the reverse gear range when the vehicle speed is not lower than a first predetermined speed, prevents the gear stage from being changed to that corresponding to the reverse gear range until the vehicle speed has fallen to a speed not greater than a second predetermined speed lower than the first predetermined speed. The control apparatus also allows the gear stage to be changed to that corresponding to the reverse gear range if the selector lever is shifted to the reverse gear range when the vehicle speed is lower than the first predetermined speed.

In a preferred aspect of the present invention, the second predetermined speed is set to be not lower than zero.

In another preferred aspect of the present invention, when where the selector lever is shifted from one of the forward drive gear ranges to the reverse gear range when a vehicle speed is not lower than a first value, the control means prevents the gear stage from being changed to that corresponding to the reverse gear range until the selector lever has been shifted from the reverse gear range to one of the forward drive gear ranges or the neutral drive range.

In a further preferred aspect of the present invention, after the selector lever is shifted to the reverse gear range when the vehicle speed is not lower than the first predetermined speed, the control means prevents the gear stage from being changed to that corresponding to the reverse gear range until the selector lever has been shifted from the reverse gear range to one of the forward drive gear ranges or the neutral gear range and the vehicle speed has fallen below a third predetermined speed which is lower than the first predetermined speed and greater than zero.

The above and other objects and features of the present invention will become apparent from the following description made with reference to the accompanying drawings.

BRIEF DESCRIPTION OF THE DRAWINGS

FIGS. 2A, 2B, 2C are schematic drawing showing a hydraulic control circuit of an automatic transmission controlled by a control apparatus for an automatic transmission which is an embodiment of the present invention.

DESCRIPTION OF THE PREFERRED EMBODIMENTS

Figure 1:
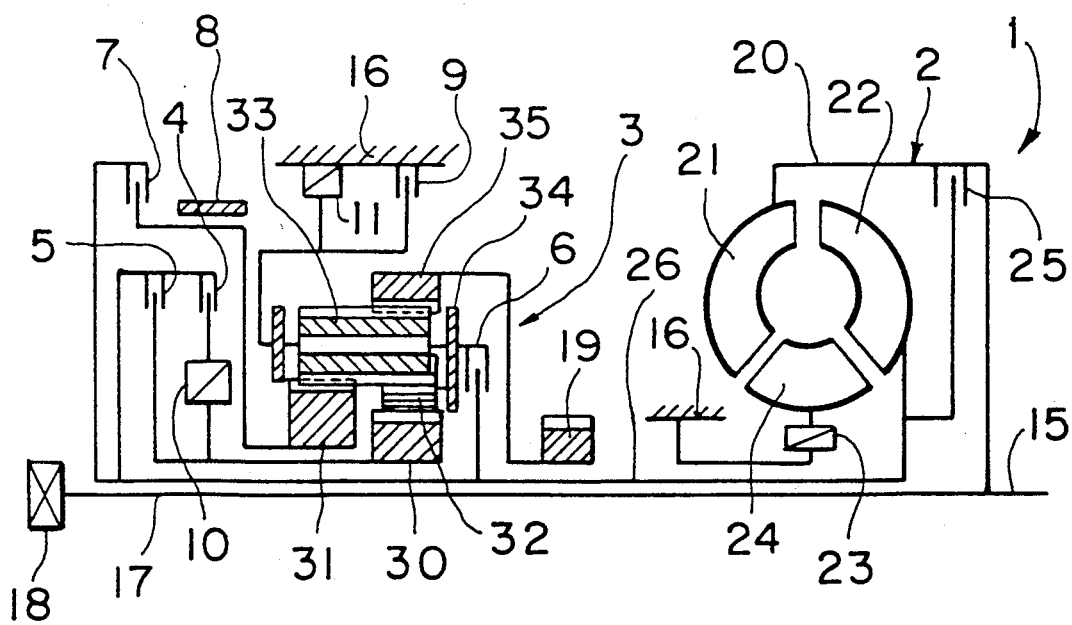
FIG. 1 is a schematic drawing showing an automatic transmission controlled by a control apparatus for an automatic transmission which is an embodiment of the present invention.

Referring to FIG. 1, an automatic transmission 1 comprises a torque converter 2, variable speed gear mechanism 3 driven by the output of the torque converter 2, a friction engagement arrangement consisting of a plurality of friction engagement units, namely, a forward clutch 4, a coast clutch 5, a 3-4 clutch 6, a reverse clutch 7, a 2-4 brake 8 and a low reverse brake 9, a first one-way clutch 10 and a second one-way clutch 11, which are adapted for switching the power transmission path of the variable speed gear mechanism 3. In the thus constituted automatic transmission 1, one drive gear range can be chosen from among a D-range, an S-range, a L-range and a R-range (a reverse gear range) and, further, one of first to fourth speeds of the D-range, one of first to third speeds of the S-range or one of first and second speeds of L-range can be chosen by selectively engaging or disengaging the friction engagement units, the first one-way clutch 10 and the second one-way clutch 11.

The torque converter 2 comprises a pump 21 fixed in a case 20 connected to an engine output shaft 15, a turbine 22 arranged opposite to the pump 21 and adapted to be driven by the pump 21 via hydraulic oil, a stator 24 arranged between the turbine 22 and the pump 21, supported by a transmission case 16 via a one-way clutch 23 and adapted for increasing torque, and a lock-up clutch 25 arranged between the case 20 and the turbine 22 and adapted for connecting the engine output shaft 15 with the turbine 22 via the case. The torque converter is constituted so that the rotation of the turbine 22 can be transmitted to the variable speed gear mechanism 3 via a turbine shaft 26. A pump shaft 17 penetrating through the turbine shaft 26 is connected to the engine output shaft 15 and an oil pump 18 located at the rear end portion of the automatic transmission can be driven by the pump shaft 17.

The variable speed gear mechanism 3 consists of a Ravignaux planetary gear unit comprising a small sun gear 30 having a small diameter and supported on the turbine shaft 26, a large sun gear 31 having a large diameter and supported on the turbine shaft 26 at the rearward portion of the small sun gear 30, a plurality of short pinion gears 32 meshed with the small sun gear 30, a long pinion gear 33 having a front portion which is meshed with the plurality of short pinion gears 32 and a rear portion which is meshed with the large sun gear 31, a carrier 34 for rotatably supporting the plurality of short pinion gears 32 and the long pinion gear 33, and a ring gear 35 meshed with the front portion of the long pinion gear 33.

The forward clutch 4 and the first one-way clutch 10 are provided in series between the turbine shaft 26 and the small sun gear 30, and a coast clutch 5 is provided in parallel with the forward clutch 4 and the first one-way clutch 10. Further, the 3-4 clutch 6 is provided between the turbine shaft 26 and the carrier 34, and the reverse clutch 7 is provided between the turbine shaft 26 and the large sun gear 31. The 2-4 brake 8 is provided between the large sun gear 31 and the reverse clutch 7 and is adapted for fixing the large sun gear 31 as a band brake. The second one-way clutch 11 for receiving the counterforce of the carrier 34 and the low reverse brake 9 for fixing the carrier 34 are provided in parallel with each other between the carrier 34 and the transmission case 16. The ring gear 35 is connected to an output gear 19 and the rotation can be transmitted from the ring gear 35 to right and left wheels (not shown) via the output gear 19 and a differential unit (not shown).

A predetermined gear stage can be chosen in a known manner by selectively engaging or disengaging the friction engagement units consisting of the forward clutch 4, the coast clutch 5, the 3-4 clutch 6, the reverse clutch 7, the 2-4 brake 8 and the low reverse brake 9, the first one-way clutches 10 and the second one-way clutch 11.

Figure 2B:
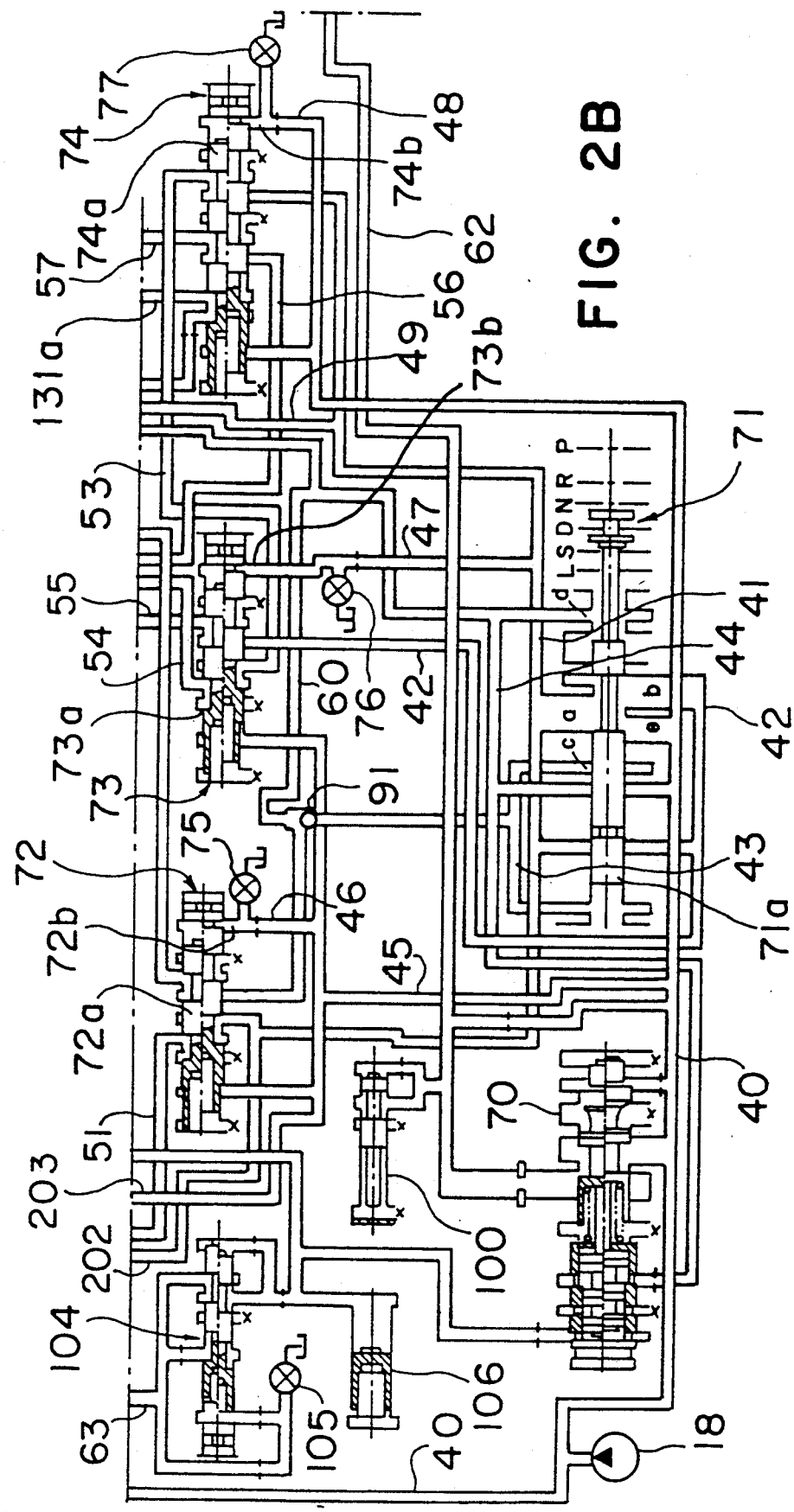
Figure 2C:
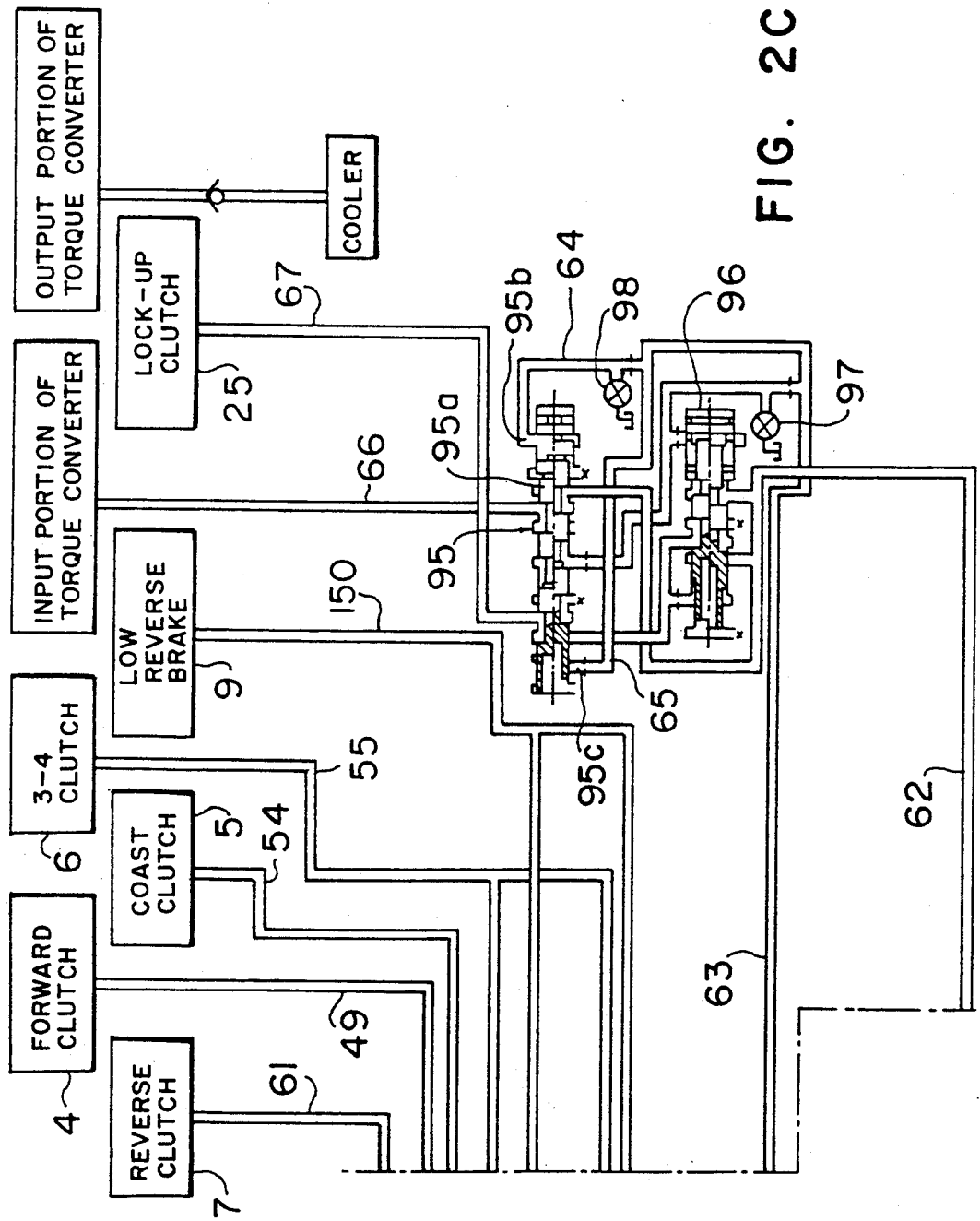

FIG. 2 is a schematic drawing showing a hydraulic control circuit for feeding and discharging hydraulic pressure to actuators of the friction engagement units consisting of the forward clutch 4, the coast clutch 5, the 3-4 clutch 6, the reverse clutch 7, the 2-4 brake 8 and the low reverse brake 9.

Referring to FIG. 2, except the actuator 8a of the 2-4 brake 8, the actuators of the friction engagement units are constituted by conventional hydraulic pistons and operate so as to engage the corresponding friction engagement units when hydraulic pressure is supplied. On the other hand, the actuator 8a of the 2-4 brake 8 is constituted by a servo piston having an application-port 8b and a release port 8c, which engages the 2-4 brake when hydraulic pressure is supplied to only the application-port 8b and disengages the 2-4 brake 8 when hydraulic pressure is supplied to both the application-port 8b and the release-port 8c or no hydraulic pressure is supplied to them.

The hydraulic control circuit is provided with a regulator valve 70 for adjusting the pressure of hydraulic oil discharged into a main line 40 from the oil pump 18 to a predetermined line pressure, a manual valve 71 for selecting ranges by manual operation, a 1-2 shift valve 72, a 2-3 shift valve 73 and 3-4 shift valve 74 which are adapted for feeding and discharging hydraulic pressure to and from the actuators of the friction engagement units in accordance with gear stages.

The manual valve 71 is provided with an input port "e" to which the line pressure is introduced from the main line 40, a first output port "a", a second output port "b", a third output port "c" and a fourth output port "d". A first output line 41, a second output line 42, a third output line 43 and a fourth output line 44 are respectively connected to the first output port "a", the second output port "b", the third output port "c" and the fourth output port "d". In the D-range and the S-range, the input port "e" communicates with the first output port "a" and the second output port "b". In the L-range, the inlet port communicates with the first output port "a" and the third output port "c". Finally, in the R-range, the inlet port communicates with the fourth output port "d".

The 1-2 shift valve 72, the 2-3 shift valve 73 and the 3-4 shift valve 74 are respectively constituted by biasing spools 72a, 73a, 74a with, springs (not shown) toward the right in FIG. 2. Pilot ports 72b, 73b, and 74b are provided on the right side of these spools 72a, 73a, 74a in FIG. 3. A pilot line 46 is connected to the pilot port 72b of the 1-2 shift valve 72 which communicates with a line 45 branching from the main line 40. A pilot line 47 branching from the first output line 41 is connected to the pilot port 73b of the 2-3 shift valve 73 and the pilot line 48 communicating with the main line 40 is connected to the pilot port 74b of the 3-4 shift valve 74. A 1-2 solenoid valve 75, a 2-3 solenoid valve 76 and a 3-4 solenoid valve 77 are associated with these pilot lines 46, 47, 48 respectively. When the respective solenoid valves 75, 76, 77 are on, they drain the corresponding pilot lines 46, 47, 48 so as to discharge pilot pressure from the corresponding pilot ports 72b, 73b, 74b of the 1-2 shift valve 72, the 2-3 shift valve 73 and the 3-4 shift valve 74, thereby positioning the corresponding spools 72a, 73a, 74a on the right side in FIG. 2. On the other hand, when they are off, they introduce pilot pressure from the pilot lines 46, 47, 48 into the corresponding pilot ports 72b, 73b, 74b, thereby positioning the corresponding spools 72a, 73a, 74a on the left side in FIG. 2.

These solenoid valves 75, 76, 77 are turned on or off in accordance with control signals from a control circuit (not shown) based upon a map experimentally determined in advance as a function of the vehicle speed and the opening of a throttle valve. As a result, since the positions of the spools 72a, 73a, 74a of the corresponding 1-2 shift valve 72, the 2-3 shift valve 73 and the 3-4 shift valve 74 are changed and oil passages communicating with the friction engagement units are switched, these friction engagement units are engaged or disengaged in predetermined combinations so that the gear stage can be changed in accordance with the driving condition.

On the other hand, a line 49 branches from the first output line 41 communicating with the main line 40 and leads to the forward clutch 4 as a forward clutch line via a one-way clutch orifice 78 in the forward drive gear range, namely, the D-range, the S-range or the L-range. Therefore, in the forward drive gear range, that is, D-range, S-range or L-range, the forward clutch 4 is always engaged. An N-D accumulator 79 is connected via a line 50 to the line 49 which serves the forward clutch line, the N-D accumulator serves as a damper when the forward clutch 4 is engaged. The reference numeral 80 designates a one-way orifice.

The first output line 41 leads to the 1-2 shift valve 72 and communicates with a servo application line 51 and further with an application-port 8b of the servo piston 8a via a one-way orifice 81 when the 1-2 solenoid 75 is turned on and the spool 72a is located on the right side in FIG. 2. Therefore, when the 1-2 solenoid 75 is on in the forward drive gear range, namely, in the second, third or fourth speed in the D-range, the second or third speed in the S-range or the second speed in the L-range, hydraulic pressure is introduced to the application-port 8b of the servo piston 8a as servo application pressure and when no hydraulic pressure is introduced to the release-port 8c, that is, in the second or fourth speed in the D-range, the second speed in the S-range or the second speed in the L-range, the 2-4 brake is actuated. A 1-2 accumulator 82 is connected to the application-port 8b of the servo piston 8a via a line 52, the 1-2 accumulator 82 serving as a damper when the 2-4 brake is actuated.

Figure 3:
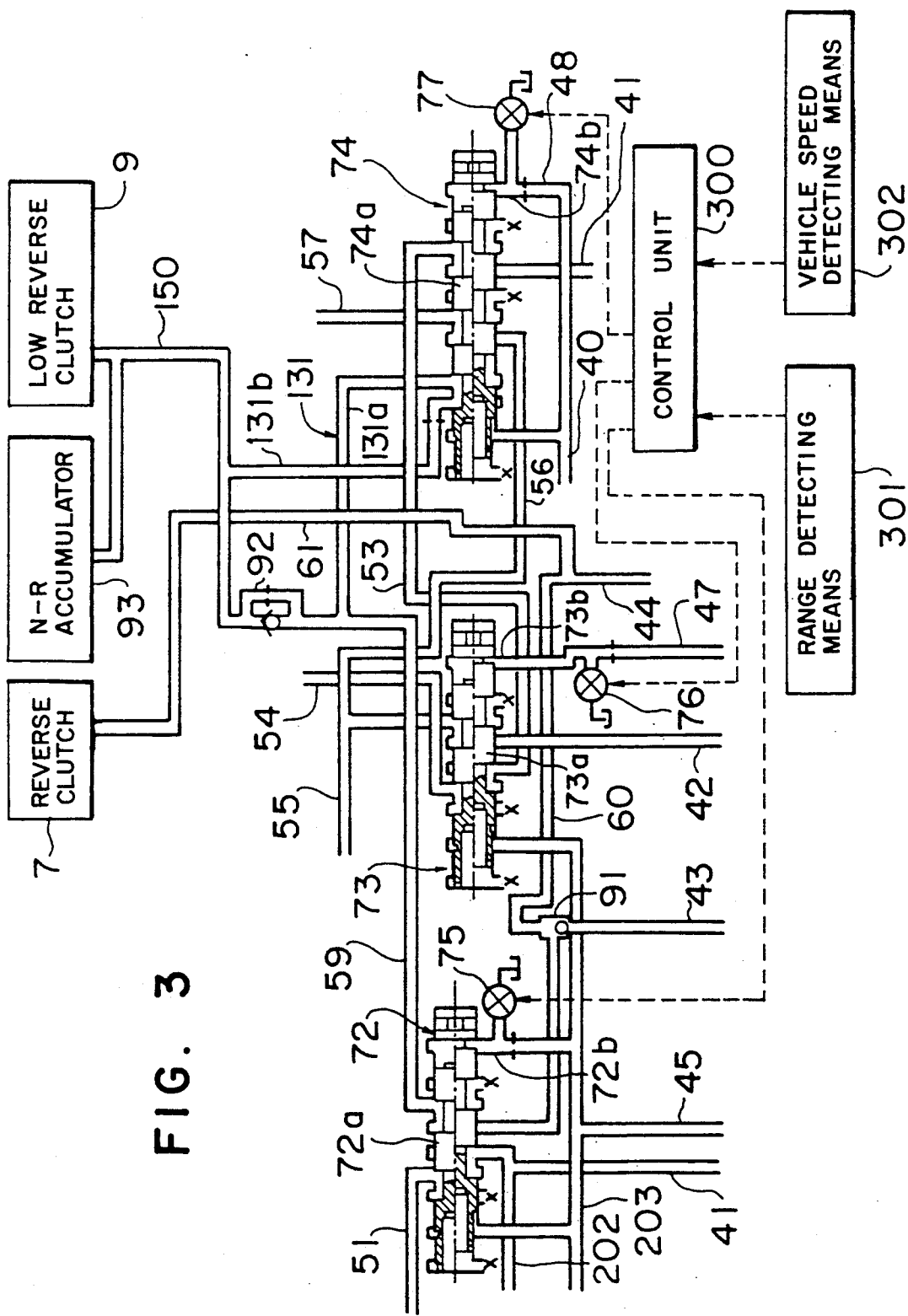
FIG. 3 is a block diagram showing a control apparatus for an automatic transmission which is an embodiment of the present invention.

Further, the first output line 41 leads to the 3-4 shift valve 74 and communicates with a line 53 when the 3-4 solenoid 77 is off and the spool 72a is located on the left side in FIG. 3. The line 53 leads to the 2-3 shift valve 73 and communicates with a coast clutch line 54 when the 2-3 solenoid valve 76 is on and the spool 73a is located on the right side in FIG. 2. The coast clutch line 54 communicates with the coast clutch 5 via a one-way orifice 83 and a ball valve 84 for switching oil passages. Therefore, when the 2-3 solenoid valve 76 is on and the 3-4 solenoid valve 77 is off in the S-range or the L-range, that is, in the second speed in the S-range, or the first or second range in the L-range, the coast clutch 5 is engaged.

Moreover, the second output line 42, which communicates with the main line 40 in the D-range or the S-range, leads to the 2-3 shift valve 73. The second output line 42 communicates with a 3-4 clutch line 55 when the 2-3 solenoid valve 76 is off and the spool 73a is located on the left side in FIG. 2 and the 3-4 clutch line 55 communicates with the 3-4 clutch 6 via a one-way orifice 85. Therefore, when the 2-3 solenoid is off in the D-range or the S-range, that is, in the third or fourth speed in the D-range, or the third speed in the S-range, the 3-4 clutch 6 is engaged. A 2-3 accumulator 86 is connected to the 3-4 clutch line 55, the 2-3 accumulator 86 serving as a damper when the 3-4 clutch 6 is engaged. The reference numeral 87 designates a one-way orifice.

A line 56 branching from the 3-4 clutch line 55 leads to the 3-4 shift valve 74 and communicates with a line 57 and further with a servo release line 58 via a 2-3 timing valve 102 when the 3-4 solenoid valve 77 is off and the spool 73a is located on the left side in FIG. 2. The servo release line 58 leads to the release-port 8c of the servo piston 8a via a one-way orifice 89. Therefore, when both the 2-3 solenoid valve 76 and the 3-4 solenoid valve 77 are off in the D-range or the S-range, that is, in the third speed in the D-range or the third speed in the S-range, servo release pressure is introduced to the release-port 8c of the servo piston 8a, thereby to release the actuation of the 2-4 brake 8.

A line 59 branching from the servo release line 58 communicates with the coast clutch line 54 via a coast timing valve 90 and the ball valve 84 and further leads to the coast clutch 5. Therefore, the coast clutch 5 is engaged in the third speed in the D-range or the third speed in the S-range where hydraulic pressure is introduced into the servo release line 58.

The third output line 43, which communicates with the main line 40 when the L-range, is selected by the manual valve 71 leads to the 1-2 shift valve 72 via a ball valve 91 serving as a change-over valve. When the 1-2 solenoid valve 75 is off and the spool 73a is located on the left side in FIG. 2, it communicates with a low reverse brake line 150 and leads to the low reverse brake 9 via a one-way orifice 92 serving as an orifice for accumulators. Therefore, when the 1-2 solenoid valve 75 is off in the L-range, that is, under the first speed in the L-range, the low reverse brake 9 is actuated. Thus, the third output line 43 constitutes a low speed range circuit in the manual valve 71 in this embodiment.

There is provided in the low reverse brake line 150 a bypass circuit 131 which bypasses the one-way orifice 92. The bypass circuit comprises a first branch path 131a, which branches from the portion upstream of the one-way orifice 92 and leads to the 3-4 shift valve 74 and a second branch path 131b, which leads from the 3-4 shift valve 74 to the portion downstream of the one-way orifice 92. The first branch path 131a and the second branch path 131b communicate with each other when the 3-4 solenoid valve 77 is off and the spool 74a is located on the left side in FIG. 2.

An N-R accumulator 93 is connected to the low reverse brake line 150, which serves as a damper when the low reverse brake 9 is actuated. The reference numeral 94 designates a one-way orifice.

The fourth output line 44, which communicates with the main line 40 when the R-range is selected by the manual valve 71, is connected to a ball valve 91 via a line 60 branching from the fourth output line 44 and leads to the reverse clutch 7 as a reverse clutch line 61.

Therefore, in the R-range, the reverse clutch 7 is always engaged, while the low reverse brake 9 is actuated only when the 1-2 solenoid valve 75 is off. Thus, the fourth output line 44 and the line 60 branching therefrom constitutes a reverse range circuit in the manual valve 71 in this embodiment.

There are associated with the hydraulic control circuit of this embodiment a lock-up shift valve 95, for actuating the lock-up clutch 25 of the torque converter 2, and a lock-up control valve 96, for controlling hydraulic pressure fed into the torque converter 2 via the lock-up shift valve 95. The reference numeral 97 designates a duty solenoid valve, and the reference numeral 98 designates a lock-up solenoid valve.

A torque converter line 62 leads from a regulator valve 70 to the lock-up shift valve 95 and lines 64, 65, which branch from a pilot line 63 branching from the main line 40 and having a pressure reducing valve 99, are respectively connected to a first pilot port 95b and a second pilot port 95c which are provided on the opposite sides of the lock-up shift valve 95. The lock-up solenoid valve 98 is associated with the line 64. When the lock-up solenoid valve 98 is on and the spool 95a of the lock-up shift valve 95 is located on the right side in FIG. 4, the torque converter line 62 communicates with a torque converter line 66 leading into the torque converter 2 and, as a result, the inner pressure of the torque converter 2 increases, so that the lock-up clutch 25 is engaged. On the contrary, when the lock-up solenoid valve 98 is turned off and the spool 95a of the lock-up shift valve 95 is moved to the left in FIG. 4, the torque converter line 62 communicates with a lock-up release line 67 so that lock-up release pressure is introduced into the torque converter 2, so that the lock-up clutch 25 is disengaged. The reference numeral 100 designates a converter relief valve.

Further, a coast timing valve 90, a bypass valve 101, a 2-3 timing valve 102 and a 3-2 timing valve 103 are associated with the hydraulic control circuit for adjusting the timing for feeding and discharging hydraulic pressure on changing the gear stage.

The coast timing valve 90 is provided on the line 59 which branches from the servo release line 58 and communicates with the coast clutch line 54 via the ball valve 84. Servo application pressure is fed to one end of the spool 90a through a line 68 which branches from the servo application line 51. When the servo release pressure introduced to the other end of the spool 90a through the line 59 and the biasing force of the spring become greater than the first-mentioned servo application pressure, the line 59 communicates with the coast clutch line 54. Therefore, when the gear stage is changed from the second speed to the third speed in the D-range or the S-range in which the coast clutch pressure is supplied to the coast clutch 5 via the line 59, since the coast clutch 5 is engaged after the servo release pressure has increased sufficiently and the actuation of the 2-4 brake 8 has been released, it is possible to prevent the double lock which would otherwise be caused when the 2-4 brake 8 and the coast clutch 5 simultaneously engage with each other. Further, since the servo application pressure is supplied to one end of the spool 90a of the coast timing valve 90, the communication timing of the line 59 can be changed in accordance with the magnitude of the servo application-pressure so that the relationship between the communication timing of the line 59 and the pressure level of the servo application-pressure can be desirably determined.

The bypass valve 101 is provided in a bypass line 69 which bypasses the one-way orifice 85 provided in the 3-4 clutch line 55. Hydraulic pressure downstream of the one-way orifice 85 in the 3-4 clutch line 55, that is, the 3-4 clutch pressure, is led from the regulator valve 70 to one end of a spool 101a. Throttle modulator pressure, controlled by a pressure control valve 104, which serves to generate pressure corresponding to engine load, is led to the other end of the spool 101a via a line 200. Therefore, when the 3-4 clutch pressure increases to or above a predetermined value and the spool 101a is moved to the left in FIG. 2, the bypass line 69 is closed. Thus, the 3-4 clutch pressure is quickly supplied from the bypass line 69 at the beginning, but thereafter is supplied slowly by the one-way orifice 85. It is possible, therefore, to desirably adjust the timing of the 3-4 clutch 6 engagement when the gear stage is changed from the second speed to the third speed. The reference numeral 105 designates a duty solenoid valve and the reference numeral 106 designates an accumulator.

The 2-3 timing valve 102 is provided between the line 57 from the 3-4 shift valve 74 and the servo release line 58 so that hydraulic pressure within the 3-4 clutch line 55, that is, 3-4 clutch pressure, is applied to one end of a spool 102a and the servo release pressure is applied to the other end thereof. Thus, the 2-3 timing valve 102 connects the servo release line 58 to the line 57 or drains the servo release line 58 with the help of the 3-4 clutch, pressure and the servo release pressure, thereby controlling the servo release pressure so as to correspond to the 3-4 clutch pressure.

The 3-2 timing valve 103 is provided between a first bypass line 201, which bypasses the one-way clutch 81 in the servo application line, and a second bypass line 202 which bypasses the one-way orifice 78 in the forward clutch line 49. A pilot line 203, which branches from the line 45 leading to the main line 40, is connected to one end of the 3-2 timing valve 103. A drain line 204 branching from the servo release line 58, is connected to a spool 103a at its central position. A 3-2 solenoid valve 107 is associated with the pilot line 203. The 3-2 timing valve 103 opens and closes the first bypass line 201 and the second bypass line 202 in response to the actuation of the 3-2 solenoid valve 107 when the gear stage is changed from the first speed to the second speed, from the third speed to the second speed or from the fourth speed to the second speed. The timing for feeding or discharging hydraulic pressure is thereby controlled. More specifically, when the gear stage is changed from the first speed to the second speed, at first the 3-2 timing valve 103 opens the first bypass line 201 and quickly supplies the servo application pressure to the application-port 8b of the servo piston 8a and closes the first bypass line 201 when a predetermined time has passed after the gear stage changing operation was started. Thereby the servo application pressure is slowly supplied to the application-port 8b of the servo piston 8a via the one-way orifice 81 in the latter half of the gear stage changing operation. When the gear stage is changed from the third speed to the second speed, at first the 3-2 timing valve 103 connects the drain line 204 with a drain port and then closes the drain line 204. As a result, the servo release pressure is quickly discharged from the drain line 204 in the first half of the gear stage changing operation and is slowly discharged therefrom by the one-way orifice 89 serving as a throttle with respect to the discharging direction. When the gear stage is changed from the fourth speed to the second speed, the 3-2 timing valve 103 opens the second bypass line 202 to quickly feed the forward clutch pressure to the forward clutch 4 in the first half of the gear stage changing operation and closes the second bypass line 202 to slowly feed the forward clutch pressure to the forward clutch 4 by utilizing the throttle function of the one-way orifice 89 in the latter half of the gear stage changing operation.

FIG. 3 is a schematic drawing showing a control apparatus for an automatic transmission which is an embodiment of the present invention.

Referring to FIG. 3, the control apparatus for the automatic transmission comprises a control unit 300, which is adapted for controlling the 1-2 solenoid valve 75, the 2-3 solenoid valve 76 and the 3-4 solenoid valve 77 to be opened or closed when the manual valve 71 is operated so as to select the R-range. In FIG. 3, primary portions of the hydraulic pressure control circuit are drawn together with the control apparatus. The control apparatus for the automatic transmission further comprises range detecting means 301 for detecting the range selected in the manual valve 71 and vehicle speed detecting means 302 for detecting vehicle speed. Range detection signals output from the range detecting means 301 and vehicle speed detection signals, output from the vehicle speed detecting means 302, are respectively input to the control unit 300.

Figure 4:
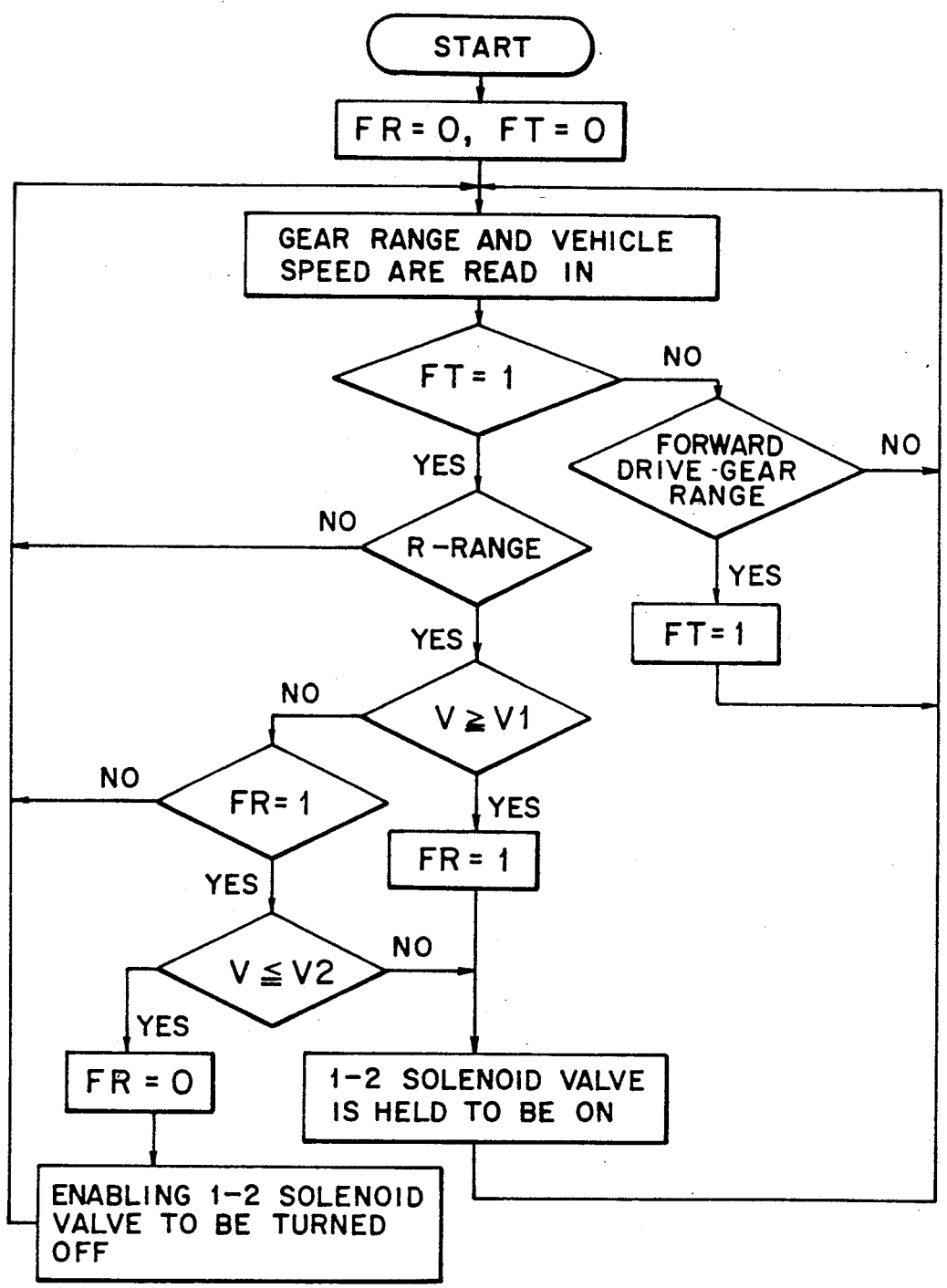
FIG. 4 is a flow chart showing an embodiment of the control effected by a control apparatus for an automatic transmission which is an embodiment of the present invention.

FIG. 4 is a flow chart showing one embodiment of the control routine effected by the control apparatus for an automatic transmission which is an embodiment of the present invention.

Referring to FIG. 4, at first, the control unit 300 sets flags FR and FT to zero. The flag FR is set to 1 when the gear stage should be prevented from being changed to the R-range and to zero when the gear stage should not be prevented from being changed to the R-range. The flag FT is set to 1 when one of the forward drive gear ranges is selected by the manual valve 71 and set to zero under other driving conditions.

After the flags FR and FT have been set, the control unit 300 starts the control operation.

At first, the control unit 300 reads the gear range selected by the manual valve 71 and the vehicle speed on the basis of the range detection signal input from the range detecting means 301 and the vehicle speed detection signal input from the vehicle speed detecting means 302 and judges whether or not the flag FT is 1.

In the first cycle, as described above, since the flag FT is set to zero, the result of the judgment is NO.

Then, the control unit 300 judges whether the gear stage corresponds to one of the forward drive gear ranges, i.e. the D-range, the S-range or the L-range.

If NO, the control unit 300 goes into the next cycle without carrying out any control operation.

On the other hand, if YES, the control unit 300 sets the flag FT to 1 and goes into the next cycle without carrying out any control operation.

From the second cycle on, at first, the control unit 300 reads the gear range selected in the manual valve 71 and the vehicle speed on the basis of the range detection signal input from the range detecting means 301 and the vehicle speed detection signal input from the vehicle speed detecting means 302 and judges whether or not the flag FT is 1.

If NO, the control unit 300 effects the same routine as in the first cycle.

On the other hand, if YES, the control unit 300 further judges whether or not the R-range is selected in the manual valve 71.

If the R-range is not selected, the control unit 300 begins the next cycle without carrying out any control operation.

On the contrary, if the control unit 300 judges that the R-range is selected, it further judges whether or not the vehicle speed V is equal to or greater than a first predetermined vehicle speed $V_1$.

When the control unit 300 judges that the vehicle speed is equal to or greater than the first predetermined vehicle speed $V_1$, this means that the selector lever was shifted from one of the forward drive gear ranges to the R-range at the time when the vehicle was moving forward at a high speed not lower than the first predetermined vehicle speed $V_1$. However, since it is not normal for the selector lever to be shifted from one of the forward drive gear ranges to the R-range during high speed driving, it is reasonable to consider that the driver has erroneously shifted the selector lever from one of the forward drive gear ranges to the R-range. Therefore, the control unit 300 sets the flag FR to 1 and goes into the next cycle while maintaining the 1-2 solenoid valve 75 on for preventing the gear stage from being changed to that corresponding to the R-range. Consequently, although the driver shifted the selector lever from one of the forward drive gear ranges to the R-range, the gear stage is kept in that during the preceding cycle and is not changed to that corresponding to the R-range.

On the contrary, if the control unit 300 judges that the vehicle speed is lower than the first predetermined vehicle speed $V_1$, it next judges whether or not the flag FR is 1.

If the control unit 300 judges that the flag FR is 1, since this means that the gear stage has been prevented from being changed to that corresponding to the R-range because the driver erroneously shifted the selector lever from one of the forward drive gear ranges to the R-range, the control unit 300 further judges whether the vehicle speed is equal to or smaller than a second predetermined vehicle speed $V_2$, which is lower than the first predetermined vehicle speed $V_1$ and greater than zero.

If YES, this means that the vehicle speed V has lowered to a speed not greater than the second predetermined vehicle speed $V_2$. Therefore, though the gear stage has been prevented from being changed to that corresponding to the R-range because the driver erroneously shifted the selector lever from one of the forward drive gear ranges to the R-range, it is considered no longer necessary to prevent the gear stage from being changed to that corresponding to the R-range. Therefore, the control unit 300 sets the flags FR and FT to zero and turns the 1-2 solenoid valve 75 off, thereby changing the gear stage to that corresponding to the R-range. Then, the next cycle is started.

On the other hand, if NO, this means that the vehicle speed V is greater than the second predetermined vehicle speed $V_2$ and has not lowered sufficiently, so that there is some risk of a problem of drivability arising if a change of the gear stage to that corresponding to the R-range is allowed. Therefore, the control unit 300 maintains the 1-2 solenoid valve 75 on for preventing the gear stage from being changed to that corresponding to the R-range and starts the next cycle. Consequently, although the driver shifted the selector lever from one of the forward drive gear ranges to the R-range, the gear stage is kept at that in the preceding cycle and is not changed to that corresponding to the R-range.

On the contrary, when the control unit 300 judges that the flag FR is not 1, this means that the selector lever was shifted to the R-range when the vehicle was moving forward at a speed not greater than the first predetermined vehicle speed $V_1$. From this, it can be considered that the driver consciously shifted the selector lever to the R-range or that even if the driver did erroneously shift the selector lever from one of the forward drive gear ranges to the R-range so that the gear stage was once prevented from being changed to that corresponding to the R-range, it is now no longer necessary to prevent the gear stage from being changed to that corresponding to the R-range because the vehicle speed V has lowered to a speed not greater than the second predetermined vehicle speed $V_2$. Therefore, the control unit 300 enables the 1-2 solenoid valve 75 to be turned off and begins the next cycle.

According to this embodiment, when the selector lever is shifted from one of the forward drive ranges to the R-range when the vehicle is moving forward at a speed not lower than the first predetermined vehicle speed $V_1$, since it can be considered that the driver erroneously shifted the selector lever to the R-range, the gear stage is prevented from being changed to the R-range until the vehicle speed V has lowered to a speed not greater than the second predetermined vehicle speed $V_2$. Therefore, it is possible to avoid a drivability problem caused by erroneous shifting of the selector lever. Further, even when the selector lever is shifted from one of the forward drive gear ranges to the R-range when the vehicle is moving forward, if the vehicle speed V is lower than the first predetermined vehicle speed $V_1$, since this can be considered to indicate that the driver consciously shifted the selector lever to the R-range after the vehicle speed was lowered by means of depressing the brake pedal or the like, the gear stage is controlled so as to be quickly changed to the R-range without any delay. Therefore, it is ensured that the gear stage can be changed to that corresponding to the R-range in the manner intended by the driver.

Figure 5:
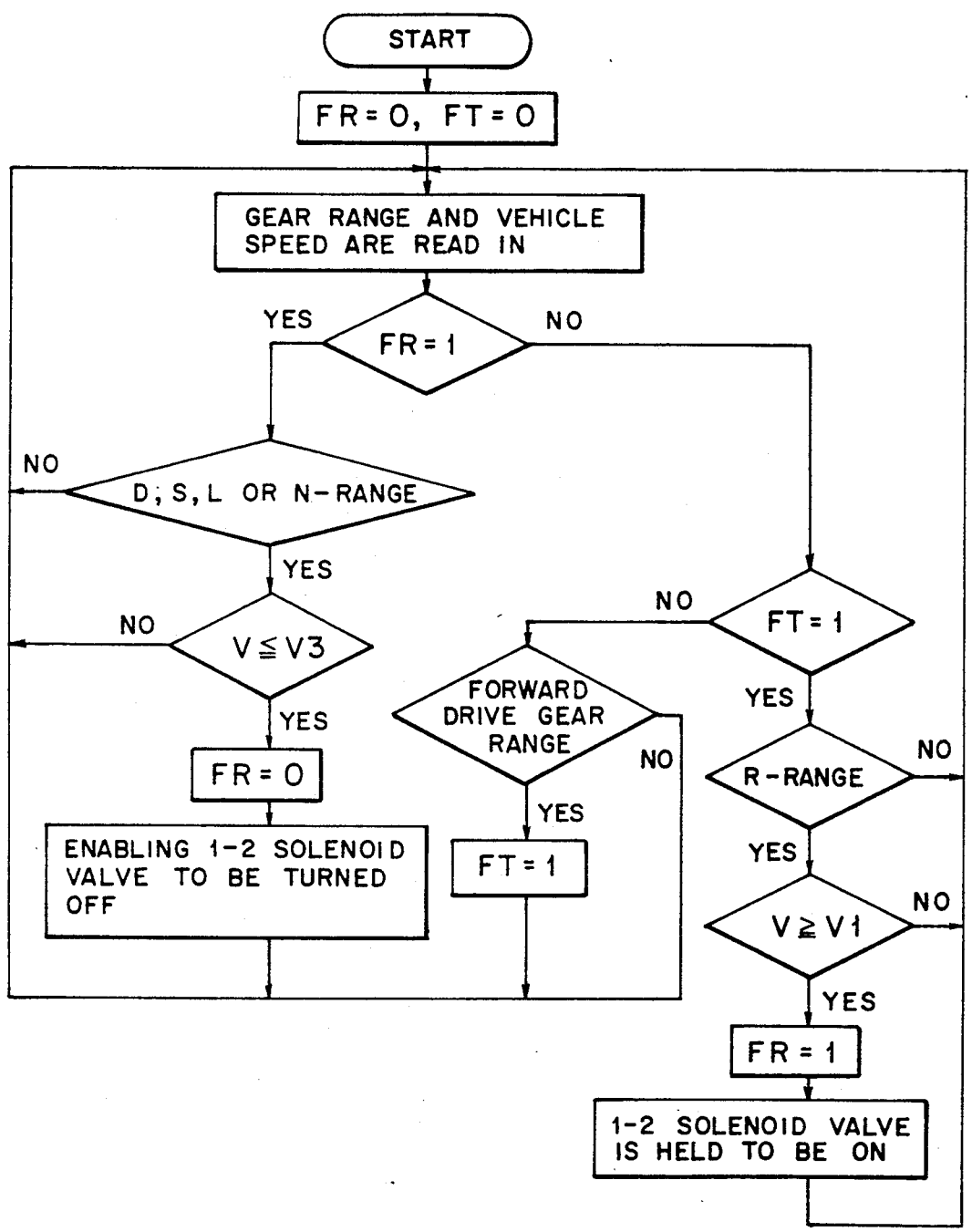
FIG. 5 is a flow chart showing another embodiment of the control effected by a control apparatus for an automatic transmission which is an embodiment of the present invention.

FIG. 5 is a flow chart showing another embodiment of a control routine effected by the control apparatus for an automatic transmission which is an embodiment of the present invention.

The embodiment shown in FIG. 5 differs from that shown in FIG. 4 as follows.

In the case where the gear stage was once prevented from being changed to that corresponding to the R-range because the selector lever was shifted from one of the forward drive gear ranges to the R-range when the vehicle was moving forward at a speed not lower than the first predetermined vehicle speed $V_1$, the control unit 300 does not allow the gear stage to be changed to that corresponding to the R-range, even when the vehicle speed V has lowered to a speed not greater than the second predetermined vehicle, speed $V_2$ so long as the R-range is selected. The control unit also does not enable the 1-2 solenoid valve 75 to be turned off, and does not allow the gear stage to be changed to that corresponding to the R-range until a gear range has been selected from among the D-range, the S-range, the L-range and the N-range by the manual valve 71 and the vehicle speed V has lowered to a speed not greater than a third predetermined vehicle speed $V_3$ which is lower than the first predetermined vehicle speed $V_1$ and greater than zero.

According to this embodiment, it is possible to preferentially prevent trouble caused by restarting the vehicle after the driver erroneously shifted the selector lever to the R-range, did not become aware of such fact and stopped the vehicle while the selector lever was in the R-range. More specifically, in the previous embodiment, since it is allowed to change the gear stage to that corresponding to the R-range when the vehicle speed has lowered to a speed not greater than the second predetermined vehicle speed $V_2$, when the driver erroneously shifted the selector lever to the R-range, did not become aware of such fact and stopped the vehicle while the selector lever was in the R-range, the gear stage is changed to that corresponding to the R-range and, therefore, there is some risk of trouble occurring when restarting the vehicle. However, in this embodiment, when the gear stage was prevented from being changed to that corresponding to the R-range since the selector lever was shifted to the R-range when the vehicle had been moving forward at a speed not lower than the first predetermined vehicle speed $V_1$, even when the vehicle speed has lowered to a speed not greater than the second predetermined vehicle speed $V_2$, the control unit 300 maintains the 1-2 solenoid valve 75 on and prevents the gear stage from being changed to that corresponding to the R-range. Therefore, even if the vehicle is stopped while the selector lever is in the R-range, since the gear stage cannot be changed to that corresponding to the R-range, it is possible to prevent trouble from occurring when restarting the vehicle. Further, after the gear stage was prevented from being changed to that corresponding to the R-range since the driver erroneously shifted the selector lever to the R-range when the vehicle was moving forward at a speed not lower than the first predetermined vehicle speed $V_1$, if the selector lever is shifted to any range other than the R-range, this can be considered to indicate that the driver became aware that he or she had erroneously shifted the selector lever to the R-range and shifted the selector lever to a gear range among the D-range, the S-range, the L-range and the N-range. It is possible, therefore, to avoid trouble caused by restarting the vehicle and change the gear stage to that corresponding to the R-range in the manner intended by the driver. Such is accomplished by having the control unit 300 not enable the 1-2 solenoid valve 75 to be turned off and not allow the gear stage to be changed to that corresponding to the R-range until the driver has shifted the selector lever to one of the forward drive gear ranges, or the N-range in the above described manner, and the vehicle speed has lowered to a speed not greater than the third predetermined vehicle speed $V_3$, which is lower than the first predetermined vehicle speed $V_1$ and greater than zero.

The present invention has thus been shown and described with reference to a specific embodiment. However, it should be noted that the present invention is in no way limited to the details of the described arrangements but changes and modifications may be made without departing from the scope of the appended claims.

For example, in the embodiment shown in FIG. 5, although the third predetermined vehicle speed $V_3$ is set so as to be lower than the first predetermined vehicle speed $V_1$ and greater than zero, since the gear stage is prevented from being changed to that corresponding to the R-range when the selector lever is shifted to the R-range when the vehicle is moving forward at a speed not lower than the first predetermined vehicle speed $V_1$, if the selector lever is shifted to one of the forward drive gear ranges or the N-range after the selector lever is erroneously shifted to the R-range, change of the gear stage to that corresponding to the R-range can be permitted by enabling the 1-2 solenoid valve to be turned off. In this case the third predetermined vehicle speed $V_3$ may be set equal to the first predetermined vehicle speed $V_1$.

As described above, according to the present invention, it is possible to provide a control apparatus for an automatic transmission, which is adapted. When the selector lever is shifted from one of forward drive gear ranges to the reverse gear range when a vehicle is moving forward, for preventing the gear stage from being to that corresponding to the R-range, if the vehicle speed is not lower than a predetermined speed, and which can allow the gear stage to be changed to that corresponding to the reverse gear range only when the driver intentionally shifts the selector lever from one of the forward drive gear ranges to the reverse range, thereby changing the gear stage to that corresponding to the reverse gear range in the manner intended by the driver.

We claim:

1. A control apparatus for an automatic transmission comprising a control unit which, in the case where a selector lever is shifted from one of forward drive gear ranges to a reverse gear range when a vehicle speed is not lower than a first predetermined speed, prevents a gear stage from being changed to that corresponding to a reverse gear range, until the vehicle speed has fallen to a speed not greater than a second predetermined speed lower than the first predetermined speed, and allows the gear stage to be changed to that corresponding to the reverse gear range if the selector lever is shifted to the reverse gear range when the vehicle speed is lower than the first predetermined speed.

2. A control apparatus for an automatic transmission in accordance with claim 1 wherein said second predetermined speed is set to be not lower than zero.

3. A control apparatus for an automatic transmission comprising a control unit which, in the case where a selector lever is shifted from one of forward drive gear ranges to a reverse gear range when a vehicle speed is not lower than a first predetermined speed, prevents a gear stage from being changed to that corresponding to a reverse gear range until the selector lever has been shifted from the reverse range to one of the forward drive gear ranges or a neutral gear range.

4. A control apparatus for an automatic transmission in accordance with claim 3 wherein after the selector lever was shifted to the reverse gear range when the vehicle speed was not lower than the first value, the control unit prevents the gear stage from being changed to that corresponding to the reverse gear range until the selector lever has been shifted from the reverse gear range to one of the forward drive gear ranges or the neutral gear range and the vehicle speed has fallen below a third predetermined speed which is lower than the first predetermined speed and greater than zero.

* * * * *